UNITED STATES PATENT OFFICE.

ADOLPHO DE SOUSA REIS, OF OPORTO, PORTUGAL.

PROCESS OF MAKING A FOOD PRODUCT FROM LUPINE BEANS.

No. 874,624.

Specification of Letters Patent.

Patented Dec. 24, 1907.

Application filed March 23, 1906. Serial No. 307,672.

*To all whom it may concern:*

Be it known that I, ADOLPHO DE SOUSA REIS, a subject of the King of Portugal, residing at Oporto, in the Kingdom of Portugal, have invented a certain new and Improved Process of Making a Food Product from Lupine Beans, of which the following is a specification.

My invention relates to the production of a food product from the lupine-bean and consists in the process and the product resulting therefrom.

Hitherto the lupine-bean has been of little or no use as a food because it possesses, in addition to its highly nutritive constituents, certain objectionable substances which render the fruit bitter and unpleasant to the taste and, therefore, undesirable as a food. This unpalatable characteristic of the lupine-bean is due to the presence of a bitter principle co-existent with the albuminoid or proteid material or materials. A complete separation of the objectionable constituents from the desirable ones results in a wholesome product entirely devoid of any unpleasant flavor and possessing a food value far greater than that of the original bean.

My invention has for its object the complete removal of the objectionable bitter principles found in the fruit of the lupine in a manner to render the same serviceable as a food product.

To this end thoroughly cleansed beans in their whole state are boiled or digested for one hour in a mixture composed of the ingredients hereinafter mentioned in the proportions given, namely, water 200 liters, acetic acid 1 liter, sea-salt 5 kilograms, this quantity being sufficient for treatment of 100 liters of the lupine beans. The preferred form of such treatment is to bring the liquid material to a state of thorough, rapid ebullition and while in this condition to add thereto the stated quantity of fruit to be digested. This treatment effects the coagulation of the albuminoid material of the bean and renders it insoluble in water. Immediately after such boiling or digestion, the beans are subjected to maceration in moving, that is, running cold water for a period approximating 48 hours. This macerating operation removes the soluble, bitter substances as well as any of the acetic acid and salt remaining, leaving the nutritious portions of the bean completely free from objectionable material. The resulting material is ground in suitable manner by means of devices known for such purpose and is then thoroughly dried at a temperature of from 50 to 60° C. A dry product of a golden color, pleasant taste and high nutritive value results from the process disclosed. This material may be subjected to grinding or comminuting operations necessary for the production of any particularly desired form of final product.

I claim:—

1. The hereindescribed process of making a food product from the lupine-bean which consists in heating the same in a solution of acetic acid and salt in the proportions substantially as specified and macerating the material in water.

2. The hereindescribed process of making a food product from the lupine-bean which consists in boiling the same in water containing acetic acid and salt in the proportions substantially as specified, macerating the material in running water and drying the resulting product.

3. The hereindescribed process of making a food product from the lupine-bean which consists in boiling the same in water containing acetic acid and sea salt in the proportions substantially as specified, macerating the material in running water to remove soluble undesired portions, grinding the purified material and drying the resulting product.

In testimony whereof I affix my signature in presence of two witnesses.

ADOLPHO DE SOUSA REIS.

Witnesses:
 J. P. KOMENT.
 MESSIAS GOMEZ.